United States Patent [19]

Girardeau et al.

[11] Patent Number: 5,156,651
[45] Date of Patent: Oct. 20, 1992

[54] GRAFT SULFONATED POLYESTERS, A METHOD OF PREPARING THEM AND THEIR APPLICATION TO SIZING TEXTILE THREADS AND FIBERS

[75] Inventors: Yvette Girardeau, Fontaines/Sur/Saone; Dominique Charmot; Jean-Francois Fiard, both of Paris, all of France

[73] Assignee: Rhone-Poulenc Chimie, Cedex, France

[21] Appl. No.: 564,710

[22] Filed: Aug. 9, 1990

Related U.S. Application Data

[63] Continuation of Ser. No. 322,285, Mar. 13, 1989, abandoned.

[30] Foreign Application Priority Data

Mar. 11, 1988 [FR] France ................................. 88 03169

[51] Int. Cl.$^5$ ................... D06M 15/507; C08L 51/08; C08F 283/01; C08F 283/02
[52] U.S. Cl. ..................................... 8/115.6; 523/501; 525/39; 525/48; 525/445
[58] Field of Search ............................ 525/39, 48, 445; 523/501, 527; 8/115.6

[56] References Cited

U.S. PATENT DOCUMENTS 4,119,680 10/1978 Vachon ................................. 525/39

FOREIGN PATENT DOCUMENTS 50-34153 11/1975 Japan .
61-201079 9/1986 Japan .

Primary Examiner—Patricia A. Short
Attorney, Agent, or Firm—Finnegan, Henderson, Farabow, Garrett and Dunner

[57] ABSTRACT

A graft sulfonated polyester. A stock or sulfonated polyester carries grafts derived from a monomeric composition based on (a) at least one carboxylic acid unsaturated through ethylene, (b) butylacrylate or a mixture of monomers containing from 60–70% by weight of butyl acrylate and (c) at least one carboxylic acid ester, unsaturated through monoethylene. The graft sulfonate polyesters are prepared by polymerizing the monomeric composition in the presence of a water dispersible sulfonated polyester. Aqueous dispersions or aqueous solutions of the graft sulfonated polyesters may be used for sizing textile threads and fibers.

28 Claims, 2 Drawing Sheets

GRAFT SULFONATED POLYESTERS, A METHOD OF PREPARING THEM AND THEIR APPLICATION TO SIZING TEXTILE THREADS AND FIBERS

This application is a continuation, of application Ser. No. 07/322,285, filed Mar. 13, 1989, now abandoned.

BACKGROUND OF THE INVENTION

The present invention relates to graft sulfonated polyesters, a method of preparing them and their application to sizing textile threads and fibers.

It is known to use sizing products in the textile industry, to improve the abrasion resistance of threads and fibers during weaving, the sizing products being eliminated with water after the weaving operation.

Aqueous dispersions or solutions of acrylic or more generally vinyl copolymers have been proposed for this purpose. It has been found that products of this type, and particularly those based on vinyl acetate, are not suitable for sizing all textile threads. For example, they have insufficient adhesion to threads based on polyesters.

Interesting products have been obtained by copolymerizing (meth)acrylic esters and (meth)acrylic acid in the presence of a water dispersible sulfonated polyester (Japanese applications published under numbers 34153/1975 and 201079/1986), for example from 30 to 60% of a water dispersible sulfonated polyester and 70 to 40% of a copolymer of (meth)acrylic esters and (meth)acrylic acids. However, these products have the drawback of being particularly expensive.

Applicants have made the surprising discovery that an effective sizing agent can be obtained (a) by considerably reducing the content of water dispersible sulfonated polyester and (b) by replacing most of the (meth)acrylic esters with, for example, vinyl acetate, which is far less expensive.

BRIEF DESCRIPTION OF THE DRAWINGS

The accompanying drawings, FIGS. 1 and 2, which are incorporated in and constitute a part of the specification, illustrate the effectiveness of the products of examples 1–9 by plotting on a curve the loss of cohesion of the sized thread as a function of the abrasion or wear.

According to the invention the new graft sulfonated polyesters are characterized in that they contain:

Figure 1:
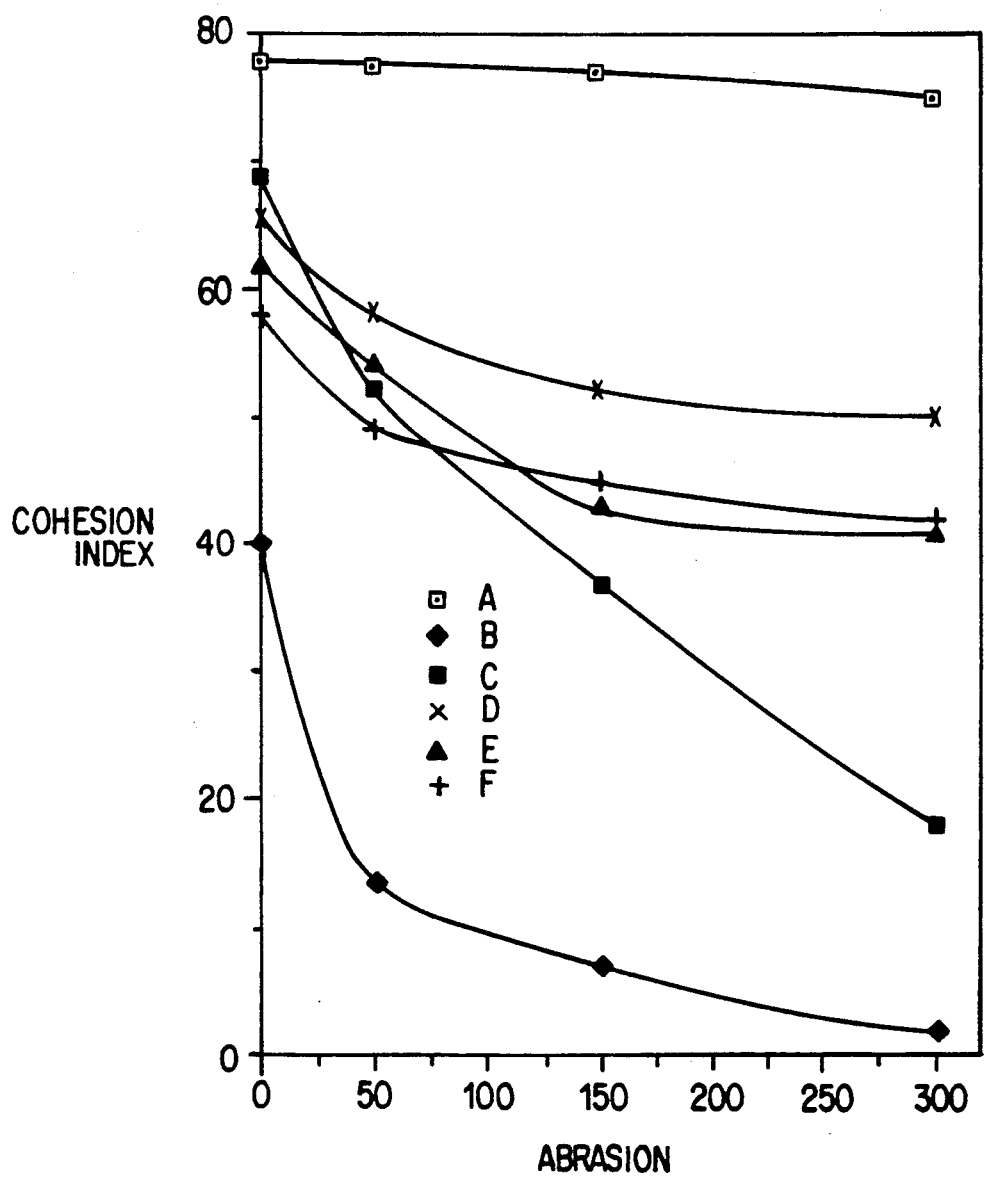

from 3 to 30, preferably from 3 to 15, and more preferably from 5 to 8, parts by weight of a stock stock polymer comprising a water dispersible sulfonated polyester and 100 parts by weight of grafts derived from a monomeric composition comprising:

. from 5 to 13, preferably from 6 to 9, parts by weight of at least one ethylenically unsaturated carboxylic acid;

. from 12 to 25, preferably from 17 to 22, parts by weight of butyl acrylate or from 25 to 40, preferably from 30 to 35, parts by weight of a mixture of ethylenically unsaturated monomers, other than (1) ethylenically unsaturated carboxylic acids and (2) monoethylenically unsaturated carboxylic acid esters, said mixture containing from 60 to 70% by weight of butyl acrylate;

. and the complement to 100 parts by weight of at least one monoethylenically unsaturated carboxylic acid ester.

In an alternative embodiment of the invention, up to about 10% of the weight of butyl acrylate may be replaced by butyl methacrylate.

A preferred product of the invention is a stock of water dispersible sulfonated polyester carrying grafts derived from at least one ethylenically unsaturated carboxylic acid, butyl acrylate (about 10% by weight of said acrylate may be replaced by butyl methacrylate) and at least one monoethylenically unsaturated carboxylic acid ester, with a butyl acrylate/water dispersible sulfonated polyester weight ratio of approximately 0.8 to 8.5 and preferably approximately 2.5 to 4.

The basic water-dispersible sulfonated polyesters forming the stock are well-known in the field of sizing textile threads. They may be prepared by co-condensing (1) an organic diacid (such as a saturated or unsaturated aliphatic diacid, an aromatic diacid, a diacid with a plurality of aromatic nuclei or an arylaliphatic diacid), a diester or an anhydride, of such an organic diacid and (2) a sulfonated organic diacid or a diester of such an organic diacid with a diol, in the presence of a normal polyesterification catalyst such as tetraisopropyl orthotitanate.

Some examples of initial monomers currently used to prepare the water dispersible sulfonated polyester stock can be given in the following categories:

organic diacids: saturated or unsaturated aliphatic diacids or aromatic diacids, such as succinic, adipic, suberic or sebacic acid, maleic acid, fumaric acid, itaconic acid, orthophthalic acid, isophthalic acid, and terephthalic acids, anhydrides of such diacids and diesters of such diacids, such as methyl, ethyl, propyl or butyl diesters. The preferred compounds are adipic acid or orthophthalic, isophthalic or terephthalic acid;

sulfonated organic diacids: sodium sulfonate diacids or diesters thereof such as dialkyl (diacoyl) isophthalates and dialkylsulfo-succinates e.g. sodium 5-dimethyl isophthalate sulfonate or sodium dimethyl sulfosuccinate;

diols: aliphatic glycols such as ethylene glycol, diethylene glycol, dipropylene glycol and upper homologues, 1,4-butane diol, 1,6-hexane diol, neopentyl glycol and cycloalkane glycols such as cyclohexane diol and dicyclohexane diol propane. The preferred diols are ethylene glycol and diethylene glycol.

The preferred water dispersible sulfonated polyesters to form the stock are those which have a number average molecular weight from 10,000 to 35,000, an acid index below 5 mg of KOH/g, and a sulfur content from 0.8 to 2%, and preferably from 1.2 to 1.8%, by weight.

Examples of the monomers from which the grafts are derived can be given in the following categories:

ethylenically unsaturated carboxylic acid: acrylic acid and methacrylic acid.

monoethylenically unsaturated carboxylic acid ester: vinyl acetate, vinyl propionate, vinyl butyrate, vinyl stearate, and vinyl benzoate.

comonomer(s) which can be copolymerized with (1) ethylenically unsaturated carboxylic acids, (2) ethylenically unsaturated carboxylic acid esters and (3) butyl acrylate, such as: $C_1$–$C_{20}$ alkyl acrylates or $C_1$–$C_{20}$ alkyl methacrylates, such as methyl, ethyl, propyl or heptadecanyl acrylates or methacrylates; acrylonitrile; acrylamide; and styrene.

The products according to the invention may be obtained by copolymerizing, in the presence of from 3 to 30, preferably from 3 to 15, and more preferably from 5 to 8, parts by weight of a water dispersible sulfonated polyester, 100 parts by weight of a monomeric composition in an aqueous medium, the composition comprising:

from 5 to 13, and preferably from 6 to 9, parts by weight of at least one ethylenically unsaturated carboxylic acid;

from 12 to 25, and preferably from 17 to 22, parts by weight of butyl acrylate, or from 25 to 40, and preferably from 30 to 35, parts by weight of a mixture of ethylenically unsaturated monomers, other than (1) ethylenically unsaturated carboxylic acids and (2) monoethylenically unsaturated carboxylic acid esters, said mixture containing from 60 to 70% by weight of butyl acrylate;

and the complement to 100 parts by weight of at least one monoethylenically unsaturated carboxylic acid ester.

In an alternative embodiment of the method of the invention, up to about 10% of the weight of butyl acrylate may be replaced with methyl methacrylate.

A preferred embodiment comprises using a mixture made up of at least one ethylenically unsaturated carboxylic acid, butyl acrylate (about 10% by weight of said acrylate may be replaced with butyl methacrylate) and at least one monoethylenically unsaturated carboxylic acid ester, in the presence of a water dispersible sulfonated polyester, with a butyl acrylate/water dispersible sulfonated polyester weight ratio of approximately 0.8 to 8.5 and preferably approximately 2.5 to 4.

The polymerizing operation may be carried out in aqueous emulsion in the conventional manner, in the presence of a water soluble polymerization promoter, an emulsifier and, if appropriate, a chain limiting agent.

Examples of water dispersible sulfonated polyesters and monomers which have been used have been given above. The nature and quantity of any ethylenically unsaturated monomer(s), which may be present together with the butyl acrylate can easily be determined by a person skilled in the art, according to the future conditions of use of the grafted polyester. These conditions of use in fact decide the properties of the product, such as its glass transition temperature, hardness, hydrophilia, mechanical properties, such as elongation at rupture and rupture strength, and the like. The addition of styrene or methacrylate, for example, is known to give a harder polymer, while the addition of hexyl acrylate is known to have the opposite effect.

The water soluble polymerization promoter may preferably be a hydroperoxide such as hydrogen peroxide or cumene, tertiobutyl or diisopropyl benzene hydroperoxide, as well as persulfates such as sodium, potassium or ammonium persulfate.

The promoter may be preferably used in quantities ranging from 0.05 to 2% by weight of the monomeric composition. In appropriate cases the promoters may be associated with a reducing agent, such as sodium bisulfite or formaldehyde sulfoxylate, polyethylene amines, sugars, such as dextrose and saccharose, or metal salts. The quantities of reducing agent used range from 0 to 3% by weight relative to the weight of the monomeric composition.

The emulsifying agent used may be one of the conventional anionic agents, preferably salts of fatty acids, alkyl sulfates, alkyl sulfonates, alkylaryl sulfonates, sulfosuccinates, alkali metal alkyl phosphates, hydrogenated or nonhydrogenated salts or abietic acid, nonionic agents such as polyoxylated fatty alcohols, polyethoxylated alkyl phenols, sulfated polyethoxylated alkyl phenols, polyethoxylated fatty acids.

The emulsifying agents are preferably used in quantities of 0.01 to 5% by weight relative to the weight of monomeric composition.

The chain limiting agent may preferably be used in proportions ranging from 0 to 3% by weight relative to the monomeric composition. It is preferably selected from thiols such as N-dodecylmercaptan, tertiododecyl mercaptan; cyclohexene; halogenated hydrocarbons such as chloroform, bromoform, carbon tetrachloride, and carbon tetrabromide; dimers of alpha methylstyrene.

The polymerizing operation is preferably carried out at a temperature of approximately 60 to 80° C. and more preferably at approximately 70° C.

The reaction preferably takes from 6 to 12 hours and more preferably about 10 hours.

If required, the latex obtained, which preferably contains about 10 to 60% by weight of graft sulfonated polyester, may be sprayed to facilitate storage and transport.

The product in the latex or in the dry state may be solubilized in water, using an alkaline, preferably volatile substance (volatile amines or ammonia). The solution thus obtained preferably contains about 5 to 30% by weight of graft sulfonated polyester. The latex, or preferably its solution, is particularly well adapted to sizing threads or fibers, particulary on a water jet loom or on dry looms in a humid atmosphere.

The invention also relates to a method of sizing warps of textile threads (yarns) comprising applying the water dispersible graft sulfonated polyesters described above in an aqueous medium, by a conventional method based on the principle of immersing the threads in an aqueous bath containing the sizing product at the desired concentration and temperature, then extracting water from the threads by passing them between rollers, and finally drying the sized threads on heating cylinders, where appropriate by previously leading them through heated chambers. The warp is then ready to be woven.

Traditional methods of sizing continuous thread (yarn filament or continuous yarn filament) include, for example, sectional sizing (European system), conventional sizing (classic system or English system) and primary sheet sizing (single end sizing or Japanese system).

The sizing products of the invention are particularly important for finishing synthetic threads (filament yarns) of ethylene glycol polyterephthalate, which are among the most difficult textile threads (yarns) to size but can also be used for fibers (spun yarns) of ethylene glycol polyterephthalate mixed with natural fibers, for glass fibers or for other threads including synthetic threads, such as acrylics, polyimides, chlorofiber, polyethylene or polypropylene, or artifical threads, such as acetates, triacetates and viscose.

Moreover, the sizing products of the invention enable any type of thread to be sized, whether or not it is textured or twisted, and any sizing method to be used, either sectional, conventional, primary sheet or other sizing processes.

A very important advantage of these products is that they are resistant to the output strains of new weaving looms. They permit high speed sizing and weaving. They can also easily be removed with water.

The following examples further illustrate preferred embodiments of the present invention. The examples should in no way be considered limiting, but are merely illustrative of the various features of the present invention.

EXAMPLE 1

The following are placed in a 6 liter reactor fitted with an anchor agitator:
2100 g of water
9.4 g of sodium acetate
9.4 g of partially sulfated, ethoxylated nonyl phenol containing 25 ethylene oxide units
502 g of GEROL PS 20 (sulfonated polyester marketed by RHONE-POULENC) in a 26.1% aqueous solution (corresponding to 131 g of dry product).

The mixture is brought to 70° with agitation at 150 rpm. 9.4 g of ammonium persulfate dissolved in 65 g of water is added.

The following are introduced continuously:
firstly, over 6 hours, a mixture of:
1370 g of vinyl acetate (VA)
375 g of butyl acrylate (BuA)
131 g of acrylic acid (AA)
7.5 g of tertiododecylmercaptan
secondly, over 8 hours, 7.5 g of tertiobutyl hydroperoxide dissolved in 46 g of water
and thirdly, over 8 hours
12.75 g of sodium formaldehyde sulfoxylate
4.7 g of sodium bicarbonate dissolved in 300 g of water.

The three continuous additions are started simultaneously. When the additions are completed, the medium is left at 70° C. for one hour and then cooled.

A latex with a solids content of 40.8% is obtained.

EXAMPLE 2

The operation described in Example 1 is repeated, using the following quantities of materials:
2024 g of water
9.4 g of sodium acetate
9.4 g of partially sulfated, ethoxylated nonyl phenol
103 g of GEROL PS 20, expressed as dry product (392 g of a 26.3% aqueous solution)
9.4 g of ammonium persulfate in 65 g of water
1294 g of vinyl acetate
169 g of acrylic acid
375 g of butyl acrylate
37.5 g of butyl methacrylate
0 g of tertiododecylmercaptan
7.5 g of tertiobutyl hydroperoxide
12.75 g of sodium formaldehyde sulfoxylate and 4.7 g of sodium bicarbonate diluted in 450 g of water
A latex with a 40% solids content is obtained.

EXAMPLE 3

The operation described in Example 1 is repeated, using the following quantities of materials:
1005 g of water
7.5 g of sodium acetate
7.5 g of partially sulfated, ethoxylated nonyl phenol
450 g of GEROL PS 20, expressed as dry product (1711 g of a 26.3% aqueous solution)
7.5 g of ammonium persulfate in 75 g of water
1095 g of vinyl acetate
105 g of acrylic acid
300 g of butyl acrylate
0 g of tertiododecylmercaptan
8.57 g of tertiobutyl hydroperoxide
10.20 g of sodium formaldehyde sulfoxylate and 3.75 g of sodium bicarbonate diluted in 450 g of water
A latex with a 40.5% solids content is obtained.

EXAMPLE 4

The operation described in Example 1 is repeated, using the following quantities of materials:
909 g of water
6.25 g of sodium acetate
6.25 g of partially sulfated, ethoxylated nonyl phenol
375 g of GEROL PS 20, expressed as dry product (1431 g of a 26.2% aqueous solution)
6.25 g of ammonium persulfate in 30 g of water
1012.5 g of vinyl acetate
87.5 g of acrylic acid
150 g of butyl acrylate
7.5 g of tertiododecylmercaptan
7.14 g of tertiobutyl hydroperoxide
8.5 g of sodium formaldehyde sulfoxylate and 3.1 g of sodium bicarbonate diluted in 300 g of water
2.5 g of mercaptoethanol
A latex with a 40.5% solids content is obtained.

EXAMPLE 5

The operation described in Example 1 is repeated, using the following quantities of materials:
2084 g of water
9.36 g of sodium acetate
9.37 g of partially sulfated, ethoxylated nonyl phenol
150 g of GEROL PS 20, expressed as dry product (569 g of a 26.4% aqueous solution)
9.37 g of ammonium persulfate in 65 g of water
1406 g of vinyl acetate
337.5 g of butyl acrylate
131.2 g of acrylic acid
7.5 g of tertiobutyl hydroperoxide
12.75 g of sodium formaldehyde sulfoxylate and 4.7 g of sodium bicarbonate diluted in water
A latex with a 41% solids content is obtained.

EXAMPLE 6 (Comparative)

The operation described in Example 1 is repeated, using the following quantities of materials:
1385 g of water
7.5 g of sodium acetate
7.5 g of partially sulfated, ethoxylated nonyl phenol
180 g of GEROL PS 20, expressed as dry product (679 g of a 26.5% aqueous solution)
7.5 g of ammonium persulfate in 75 g of water
945 g of vinyl acetate
105 g of acrylic acid
450 g of butyl acrylate
0 g of tertiododecylmercaptan
8.57 g of tertiobutyl hydroperoxide
10.2 g of sodium formaldehyde sulfoxylate and 3.75 g of sodium bicarbonate diluted in 450 g of water
A latex with a 40.6% solids content is obtained.

EXAMPLE 7 (Comparative)

The operation described in Example 1 is repeated, using the following quantities of materials:
1005 g of water
7.5 g of sodium acetate
7.5 g of partially sulfated, ethoxylated nonyl phenol
450 g of GEROL PS 20, expressed as dry product (1711 g of a 26.3% aqueous solution)
7.5 g of ammonium persulfate in 75 g of water
945 g of vinyl acetate 105 g of acrylic acid
450 g of butyl acrylate
0 g of tertiododecylmercaptan
8.57 g of tertiobutyl hydroperoxide
10.20 g of sodium formaldehyde sulfoxylate and 3.75 g of sodium bicarbonate diluted in 450 g of water A latex with a 40.4% solids content is obtained.

EXAMPLE 8 (Comparative)

The following are placed in a 6 liter reaction fitted with an anchor agitator:

2156 g of water
1.5 g of NANZA SB 62 based on sodium dodecylbenzene sulfonate, marketed by ALBRIGHT & WILSON
450 g of GEROL PS 20 sec.

The mixture is brought to 80° C. with agitation at 150 rpm. 1,875 g of ammonium persulfate dissolved in 20 g of water are added.

The following are introduced continuously:
firstly, over 5 hours, a mixture of:
. 75 g of acrylic acid (AA)
. 75 g of methacrylic acid (MAA)
. 300 g of ethyl acrylate (EA)
. 600 g of butyl acrylate (BuA)
. 450 g of methyl methacrylate (MeMA)
. 5.62 g of tertiododecylmercaptan
and secondly, over 5 hours, a mixture of:
. 7 5 g of ammonium persulfate and 30 g of partially sulfated, ethoxylated nonylphenol dissolved in 420 g of water The two additions are started simultaneously.
When they are over, the medium is left at 80° C. for one hour and cooled.

A latex with a solids content of 43% is obtained.

EXAMPLE 9 (Comparative)

The operation described in Example 8 is repeated, using 150 g (instead of 450 g) of GEROL PS 20 sec and 1700 g (instead of 2156 g) of water.

SIZING TEST

Sizing tests are carried out with aqueous solutions of the products from Examples 1 to 9, the solutions forming the baths of size.

The solutions are prepared as follows: after dilutions with demineralized water to a solids content of 20%, the products are brought to 60° C., then a 20% aqueous ammonia solution is added over half an hour until a pH of approximately 7.5 is obtained.

The sizing operation is carried out with a SUCKER laboratory machine (marketed by SUCKER) adapted to follow the "primary sheet" system, on a warp of 100 decitex, 88 strand, non-woven polyester, passing over the sizing machine at 100 m/min: the settings are optimized so that 10% of dry polymer is deposited on the thread relative to the weight of the thread.

The operation is basically as follows: the polyester warp is immersed in a bath of size, then dried by passing it into chambers heated to 145° then over cylinders heated to temperatures which decrease from 125° to 100° C.; a lubricant (molten wax at 90° C.) is applied to the thread in quantities of 0.3% relative to the weight of the thread, at the outlet from the drying cylinders. After being cooled in a cooling chamber, the threads are wound onto the primary beams; these are then put together to form a beam for the weaving loom.

The effectiveness of the products tested is assessed before the primary beams are put together, using the "SHIRLEY FILAMENT COUNTER" apparatus of the SHIRLEY INSTITUTE in Manchester and the method published at the Seventh Textile Sizing Symposium in Mulhouse on Oct. 15, 16 and 17 of 1986.

The test consists of measuring the ability of a polymer to stick together the individual strands forming the thread.

In the measuring process, the apparatus records and counts the vibrations emitted when the individualized elements, consisting of an individual strand or a plurality of strands stuck together, are divided up. The cohesion index C is expressed by the equation $$C = 100\,(n-x)/(n-1)$$

when n represents the number of individual strands making up the thread and x the number of individualized elements counted.

In the absence of size, all the individual strands are independent; x is then equal to n and $C = 0$.

There is maximum cohesion when all the individual strands are bonded; x is then equal to 1 and $C = 100$.

The cohesion index is measured before and after work on a WEBTESTER wear meter of the Reutligen Textile Institute (the measurements being taken after 50, 150 and 300 cycles).

(The apparatus simulates the work undergone by the thread during the weaving operation).

A curve is then plotted, representing the loss of cohesion of the sized thread as a function of the work undergone (abrasion or wear).

The references of the curves corresponding to the products tested are given below.

| Product of Example | Reference |
| --- | --- |
| 1 | D |
| 2 | F |
| 3 | G |
| 4 | I |
| 5 | E |
| 6 | — |
| 7 | J |
| 8 | H |
| 9 | K |

Examples 1 to 5 are also compared:
with a solution of GEROL AS 10 marketed by RHONE-POULENC (an "all acrylic" copolymer based on butyl acrylate, that is to say, not derived from monomers other than acrylic or methacrylic esters or acids and without any sulfonated polyester units).

with a solution of GEROL VS 30 marketed by RHONE-POULENC (a copolymer derived from a high proportion of vinyl acetate, from butyl acrylate and from unsaturated carboxylic acid and without any sulfonated polyester units).

and with a solution of GEROL PS 20 marketed by RHONE-POULENC (water dispersible sulfonated polyester).

The references of the curves corresponding to the products are as follows:

| Product | Reference |
| --- | --- |
| GEROL AS 10 | C |
| GEROL VS 30 | B |

-continued

| Product | Reference |
| --- | --- |
| GEROL PS 20 | A |

Figure 2:
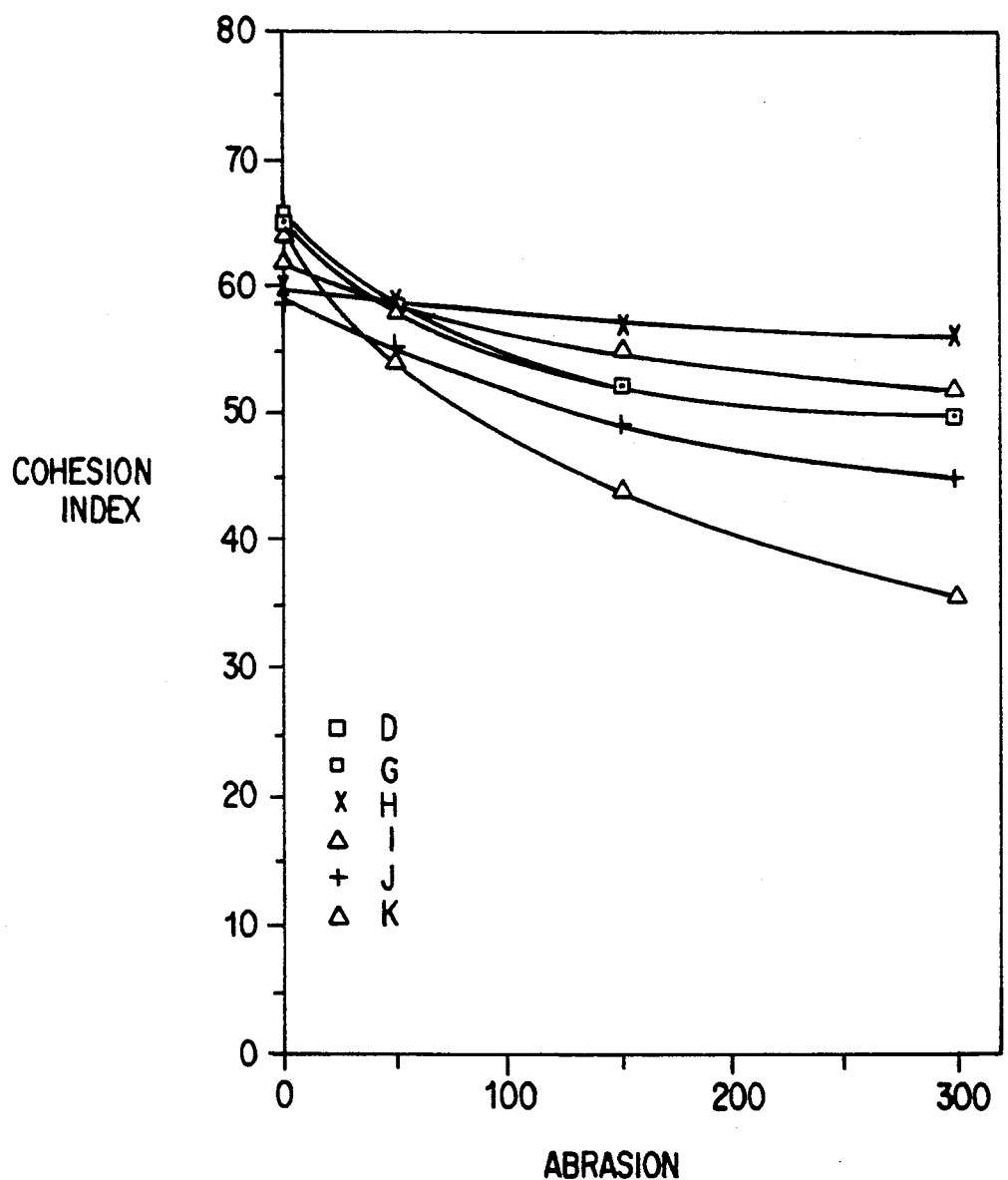

The set of curves corresponding to the products of the invention or the comparative products are shown in FIGS. 1 and 2.

Analysis of the curves shows that:

GEROL AS 10 (the "all acrylic" copolymer) is clearly more effective than GEROL VS 30 (the copolymer based on vinyl acetate).

On the other hand it is surprising to find that the product of Example 1 and that of Example 9, of the following respective compositions:

| Example 1 | | Example 9 | |
| --- | --- | --- | --- |
| Ingredients | PBW[1] | Ingredients | PBW |
|  |  | MAA | 5 |
| AA | 7 | AA | 5 |
| VA | 73 | EA | 20 |
| BuA | 20 | BuA | 40-90 |
|  |  | MeMA | 30 |
| PS 20 | 7 | PS 20 | 7 |

[1] PBW is an abbreviation for parts by weight.

show similar results, whereas a far superior performance would have been expected of the product of Example 9. As the cost of acrylic esters is about 3 times that of the vinyl acetate, the importance of the product of Example 1 as compared with that of Example 9 will be immediately apparent.

The product of Example 8 is slightly more effective than that of Example 1, but its content of butyl acrylate and GEROL PS 20 make its price prohibitive for the performance obtained. The cost of GEROL PS 20 is presently in fact at least 10 times that of vinyl acetate;

According to Example 4, it is preferred to maintain a certain ratio between the content of GEROL PS 20 and that of butyl acrylate.

The product of Example 7 gives good results in the cohesion test but cannot be used industrially, since it produces blocking (blocking on beams) when the primary beams are put together or the thread is unwound from the beam bobbin onto the loom.

The method of Example 6 could not be subjected to the cohesion test, since many individual strands of the sized thread were found to be broken due to blocking, when the bobbins were unwound to carry out the test.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of the general inventive concepts as defined by the appended claims and their equivalents.

What is claimed is:

1. A graft sulfonated polyester comprising:
   from 3 to 30 parts by weight of a stock polymer comprising a water dispersible sulfonate polyester and 100 parts by weight of grafts derived from a monomeric composition comprising:
   from 5 to 13 parts by weight of at least one ethylenically unsaturated carboxylic acid;
   from 12 to 25 parts by weight of butyl acrylate or from 25 to 40 parts by weight of a mixture of ethylenically unsaturated monomers selected from the group consisting of $C_1$-$C_{20}$ alkyl acrylates, $C_1$-$C_{20}$ alkyl methacrylates, acrylonitrile, acrylamide and styrene, said mixture containing from 60 to 70% by weight of butyl acrylate; and
   the complement to 100 parts by weight of vinyl acetate.

2. A graft sulfonated polyester comprising:
   from 3 to 15 parts by weight of a stock polymer comprising a water dispersible sulfonated polyester and 100 parts by weight of grafts derived from a monomeric composition comprising:
   from 6 to 9 parts by weight of at least one ethylenically unsaturated carboxylic acid;
   from 17 to 22 parts by weight of butyl acrylate or from 30 to 35 parts by weight of a mixture of ethylenically unsaturated monomers selected from the group consisting of $C_1$-$C_{20}$ alkyl acrylates, $C_1$-$C_{20}$ alkyl methacrylates, acrylonitrile, acrylamide and styrene, said mixture containing from 60 to 70% by weight of butyl acrylate; and
   the complement to 100 parts by weight of vinyl acetate.

3. The graft sulfonated polyester of claim 2, wherein said graft sulfonated polyester contains from 5 to 8 parts by weight of a stock polymer comprising a water dispersible sulfonated polyester.

4. A graft sulfonated polyester obtained by
   (a) copolymerizing, in the presence of 3 to 30 parts by weight of a water dispersible sulfonated polyester, 100 parts by weight of a monomeric composition in an aqueous medium, said composition comprising:
   from 5 to 13 parts by weight of at least one ethylenically unsaturated carboxylic acid;
   from 12 to 25 parts by weight of butyl acrylate or from 25 to 40 parts by weight of a mixture of ethylenically unsaturated monomers selected from the group consisting of $C_1$-$C_{20}$ alkyl acrylates, $C_1$-$C_{20}$ alkyl methacrylates, acrylonitrile, acrylamide and styrene, said mixture containing from 60 to 70% by weight of butyl acrylate; and
   the complement to 100 parts by weight of vinyl acetate; and
   (b) removing any water.

5. An aqueous dispersion of the graft sulfonated polyesters of claim 4.

6. A graft sulfonated polyester obtained by
   (a) copolymerizing, in the presence of 3 to 30 parts by weight of a water dispersible sulfonated polyester, 100 parts by weight of a monomeric composition in an aqueous medium, said composition comprising:
   from 6 to 9 parts by weight of at least one ethylenically unsaturated carboxylic acid;
   from 17 to 22 parts by weight of butyl acrylate or from 30 to 35 parts by weight of a mixture of ethylenically unsaturated monomers selected from the group consisting of $C_1$-$C_{20}$ alkyl acrylates, $C_1$-$C_{20}$ alkyl methacrylates, acrylonitrile, acrylamide and styrene, said mixture containing from 60 to 70% by weight of butyl acrylate; and
   the complement to 100 parts by weight of vinyl acetate; and
   (b) removing any water.

7. An aqueous dispersion of the graft sulfonated polyester of claim 6.

8. The aqueous dispersion of claim 7, wherein said copolymerization of the monomeric composition is carried out in the presence of 5 to 8 parts by weight of water dispersible sulfonated polyester.

9. The graft sulfonated polyester of claim 6, wherein said copolymerization of the monomeric composition is carried out in the presence of 5 to 8 parts by weight of water dispersible sulfonated polyester.

10. The graft sulfonated polyester of claim 1, wherein up to about 10% of the weight of butyl acrylate is replaced with butyl methacrylate.

11. The graft sulfonated polyester of claim 1, wherein the weight ratio of butyl acrylate to water dispersible sulfonated polyester is approximately from 0.8 to 8.5.

12. The graft sulfonated polyester of claim 11, wherein the weight ratio of butyl acrylate to water dispersible sulfonated polyester is approximately from 2.5 to 4.

13. The graft sulfonated polyester of claim 1, wherein the water dispersible sulfonated polyester has a number average molecular weight of from 10,000 to 35,000, an acid index below 5 mg of KOH/g and a sulfur content from 0.8 to 2% by weight.

14. The graft sulfonated polyester of claim 11, wherein the ethylenically unsaturated carboxylic acid is selected from the group consisting of acrylic acid and methacrylic acid.

15. An aqueous dispersion of graft sulfonated polyesters, wherein said aqueous dispersion contains from 10 to 60% by weight of the graft sulfonated polyester of claim 1.

16. An aqueous solution comprising from 5 to 30% by weight of the graft sulfonated polyester of claim 1.

17. A method of preparing a graft sulfonated polyester comprising the steps of
    (a) copolymerizing, in the presence of 3 to 30 parts by weight of a water dispersible sulfonated polyester, 100 parts by weight of monomeric composition in an aqueous medium, said composition comprising:
        from 5 to 13 parts by weight of at least one ethylenically unsaturated carboxylic acid;
        from 12 to 25 parts by weight of butyl acrylate or from 25 to 40 parts by weight of a mixture of ethylenically unsaturated monomers selected from the group consisting of $C_1$-$C_{20}$ alkyl acrylates, $C_1$-$C_{20}$ alkyl methacrylates, acrylonitrile, acrylamide and styrene, said mixture containing from 60 to 70% by weight of butyl acrylate; and
        the complement to 100 parts by weight of vinyl acetate; and
    (b) removing any water.

18. A method of preparing a graft sulfonated polyester comprising the steps of:
    (a) copolymerizing, in the presence of 3 to 15 parts by weight of a water dispersible sulfonated polyester, 100 parts by weight of a monomeric composition in an aqueous medium, said composition comprising:
        from 6 to 9 parts by weight of at least one ethylenically unsaturated carboxylic acid;
        from 17 to 22 parts by weight of butyl acrylate or from 30 to 35 parts by weight of a mixture of ethylenically unsaturated monomers selected from the group consisting of $C_1$-$C_{20}$ alkyl acrylates, $C_1$-$C_{20}$ alkyl methacrylates, acrylonitrile, acrylamide and styrene, said mixture containing from 60 to 70% by weight of butyl acrylate; and
        the complement to 100 parts by weight of vinyl acetate; and
    (b) removing any water.

19. The method of claim 18, wherein the monomeric composition is copolymerized in the presence of 5 to 8 parts by weight of water dispersible sulfonated polyester.

20. The method of claim 17, wherein up to about 10% of the weight of butyl acetate is replaced with butyl methacrylate.

21. The method of claim 17, wherein the weight ratio of butyl acrylate to water dispersible sulfonated polyester is approximately from 0.8 to 8.5.

22. The method of claim 21, wherein the weight ratio of butyl acrylate to water dispersible sulfonated polyester is approximately from 2.5 to 4.

23. The method of claim 17, wherein the water dispersible sulfonated polyester has a number average molecular weight from 10,000 to 35,000, an acid index below 5 mg of KOH/g and a sulfur content from 0.8 to 2% by weight.

24. The method of claim 17, wherein the ethylenically unsaturated carboxylic acid is selected from the group consisting of acrylic acid and methacrylic acid.

25. A method of preparing an aqueous solution of the graft sulfonated polyesters comprising the step of solubilizing the graft sulfonated polyesters of claim 1 in water with an alkaline substance.

26. The method of claim 25, wherein said alkaline substance is a volatile amine or ammonia.

27. A method for sizing a textile thread or a fiber comprising the step of performing on said thread or said fiber a sizing operation utilizing the aqueous dispersion of claim 5.

28. A method for sizing a textile thread or a fiber comprising the step of performing on said thread or said fiber a sizing operation utilizing the aqueous solution of claim 16.

* * * * *

UNITED STATES PATENT AND TRADEMARK OFFICE
CERTIFICATE OF CORRECTION

PATENT NO. : 5,156,651

DATED : OCTOBER 20, 1992

INVENTOR(S) : YVETTE GIRARDEAU ET AL.

It is certified that error appears in the above-identified patent and that said Letters Patent is hereby corrected as shown below:

In Claim 6, Column 10, line 48, the number "30" should read --15--.

Signed and Sealed this

Twenty-sixth Day of October, 1993

Attest:

BRUCE LEHMAN

Attesting Officer     Commissioner of Patents and Trademarks